INVENTORS  A. ASHKIN
E. P. IPPEN

July 4, 1972  A. ASHKIN ET AL  3,674,335
LIGHT WAVE COUPLING INTO THIN FILM LIGHT GUIDES
Filed May 25, 1970  2 Sheets-Sheet 2

United States Patent Office 3,674,335
Patented July 4, 1972

3,674,335
LIGHT WAVE COUPLING INTO THIN FILM LIGHT GUIDES
Arthur Ashkin, Rumson, and Erich Peter Ippen, Middletown, N.J., assignors to Bell Telephone Laboratories, Incorporated, Murray Hill, N.J.
Filed May 25, 1970, Ser. No. 40,079
Int. Cl. G02b 5/14, 5/18; H01p 3/00
U.S. Cl. 350—96 WG
14 Claims

ABSTRACT OF THE DISCLOSURE

Light waves are coupled into an optical wave guide by means of an optical grating disposed along one surface of the guide. The coupling is varied by varying the angle of incidence of the light to be coupled.

BACKGROUND OF THE INVENTION

This invention relates to methods and apparatus for coupling light waves into thin film light conductors.

The use, in optical communication systems, optical data processing systems, and various other systems utilizing light, of integrated optics has been the subject of much interest. The advantages of integrated circuit techniques for use in the optical region of the electromagnetic spectrum are many, corresponding to the equivalent advantages at lower frequencies. Thus miniaturization, minimization of ambient effects such as vibration and thermal effects, and reproducibility at low cost are all realizable with integrated optical circuitry.

One of the more promising arrangements for achieving integration of optical circuitry is the use of thin film light guides, wherein the film is generally of a thickness approximating the wavelength of the light to be transmitted. Such thin films, however, make it quite difficult to introduce light into the thin film with any relevant degree of efficiency.

In a copending U.S. patent application, Ser. No. 793,696 of P. K. Tien, filed Jan. 24, 1969, now U.S. Pat. No. 3,584,230 which issued June 8, 1971, there is disclosed an arrangement utilizing an internal reflection prism for coupling light waves into the thin film through a major surface thereof. The prism coupling has proven to be far more efficient than prior arrangements such as those wherein the light is introduced into the guide through one end thereof. On the other hand, the prism arrangement is, relatively speaking, somewhat bulky, and the reduction of this bulk would enable further miniaturization of the system. In addition, while the prism arrangement is much more efficient than prior art devices, an increase in the coupling efficiency is always welcome. The present invention accomplishes both a reduction in bulk or size of the coupling arrangement and makes possible high coupling efficiency.

SUMMARY OF THE INVENTION

In a first illustrative embodiment of the invention, coherent light is coupled into a thin light guide by means of an optical reflection grating placed in contact with the guide on the side thereof opposite the side of incidence of the light. The incident light passes through the light guide and is reflected by the grating, and, depending upon the angle of incidence of the light, a portion of the reflected light, in one or more of the grating orders, is trapped in the light guide. The light thus trapped has a component of its propagation constant in the longitudinal direction of the guide and induces and interacts with a particular waveguide mode, depending upon, among other things, the angle of incidence of the light and the grating periodicity.

In a modification of the first illustrative embodiment, the reflection grating is formed on one surface of the light guide itself.

In a second illustrative embodiment of the invention, a transmission grating, either an absorption grating or a phase grating is deposited on or formed on one principal surface of the light guide, and the light is made incident on the grating. As in the first embodiment of the invention, one of the grating orders, depending upon the angle of incidence, is trapped in the guide and induces a particular propagating waveguide mode.

It is a feature of the present invention that light is coupled into a thin film light guide by means of an optical grating, which may be a reflection, absorption, or phase grating.

It is another feature of the present invention that the efficiency of coupling and the mode excited in the light guide can be varied by variations in the angle of incidence of the light to be coupled.

These and other features of the present invention will be more readily apparent from the following description taken in conjunction with the accompanying drawings.

DETAILED DESCRIPTION

Figure 1:
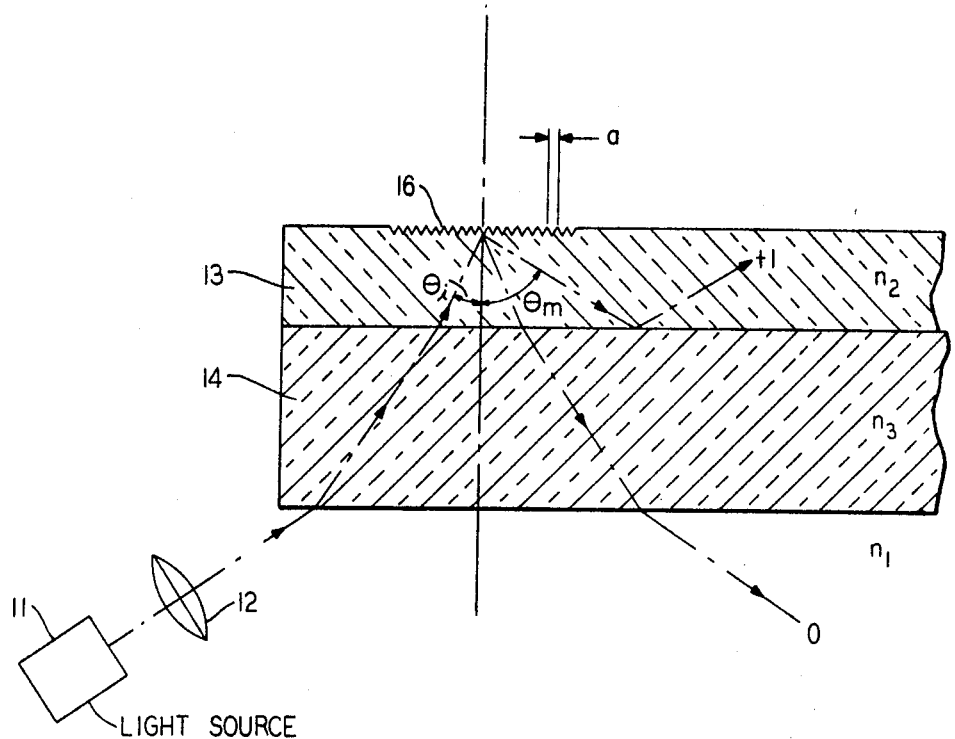
FIG. 1 is a diagrammatic view of a first illustrative embodiment of the invention.

In FIG. 1 there is shown, greatly enlarged, a diagrammatic view of one embodiment of the invention wherein a reflection grating is used to produce coupling of incident light into a thin film light conductor.

The arrangement of FIG. 1 comprises a source 11 of light, such as, for example, a helium-neon laser having a coherent light output of 6328 A. Any suitable source may, of course, be used, that mentioned here being by way of example only. A lens arrangement 12 may be used to focus the light, where necessary.

A thin film light guide 13, of any suitable transparent light guiding material, such as, for example, glass, is mounted on a suitable substrate 14 that is transparent to the wavelength of the light to be coupled. Guide 13 and substrate 14 are, although not necessarily, chosen preferably such that their indices of refraction have the relationship $n_2 > n_3 > n_1$ where $n_2$ is the index of refraction of guide 13, $n_3$ is the index of refraction of substrate 14, and $n_1$ is the index of refraction of air. It is possible to sandwich the guide and grating between two dielectric members of equal index of refraction or of any desired ratio of indices, where both are less than the guide index.

In the arrangement of FIG. 1, a reflection grating 16 is shown formed on the surface of guide 13 opposite the surface thereof in contact with substrate 14. To insure substantially total reflection, grating 16, which may be cut, pressed, stamped, deposited or otherwise formed in or on guide 13, or which may be a separate element in contact with or closely adjacent guide 13, is silvered on its exterior surface. In the analysis that follows, the periodicity of grating 16 is designated by the letter $a$.

The light from source 11 is directed onto substrate 14 at an angle such that, after passing through substrate 14 and guide 13 it is incident upon grating 16 at an angle $\theta_i$, as shown in FIG. 1, and reflected therefrom in one or more grating orders. In FIG. 1 only two reflection grating orders are shown, the zero order, which is reflected back out of the assembly, and the +1 order, which is reflected at the angle $\theta_m$, where $m$ represents the order number, in this case $m=1$. In FIG. 1 the angle $\theta_m$ is shown to be such that the +1 order is trapped in the light guide 13. The angle $\theta_m$ is related to the angle $\theta_i$ by $$\sin \theta_m = \sin \theta_i + \frac{m\lambda_o}{an_2} \quad (1)$$

where $\lambda_o$ is the wavelength of the light in vacuum. In order for the light in a particular grating order to be trapped in the guide, the minimum value of $\theta_m$ is given by $$\sin \theta_m \geq \frac{n_3}{n_2} \quad (2)$$

whereas the maximum value of $\theta_m$ obviously is $\pi/2$ in which case the light travels parallel to the longitudinal axis of the guides. The light trapped in the guide, i.e., the +1 order in FIG. 1 has a propagation constant $\beta$ along the guide axis given by $$\beta_m = \frac{2\pi n_2 \sin \theta_m}{\lambda_o} \quad (3)$$

It can be seen from Equation 3 that $\beta_m$ can be varied by varying the angle $\theta_m$, which in turn, as can be seen from Equation 1, is varied by variations in $\theta_i$. Any suitable means may be used for varying $\theta_i$, such as movement of source 11, interposition of light deflecting elements, or movement of the assembly of guide 13 and substrate 14 relative to the source 11. It is well known that a light guide such as depicted in FIG. 1 is capable of supporting large numbers of waveguide modes, each with a characteristic propagation constant $\beta$. In general, the values of $\beta$ for the various modes range from $n_3 \omega/c$ to $n_2 \omega/c$ where $\omega$ is the angular frequency of the light and $c$ is the velocity of light in a vacuum. Thus, phase matching of the trapped light and a propagating waveguide mode occurs within the limits defined by $$\frac{n_3 \omega}{c} \leq \beta_m \leq \frac{n_2 \omega}{c} \quad (4)$$

where $n_2 > n_3$. Where it is desired to couple to a particular waveguide mode, and its $\beta$ is known, then the $\beta$ of Equation 3 can be made equal to the $\beta$ of the desired mode by proper selection of $\theta_i$.

Figure 2:
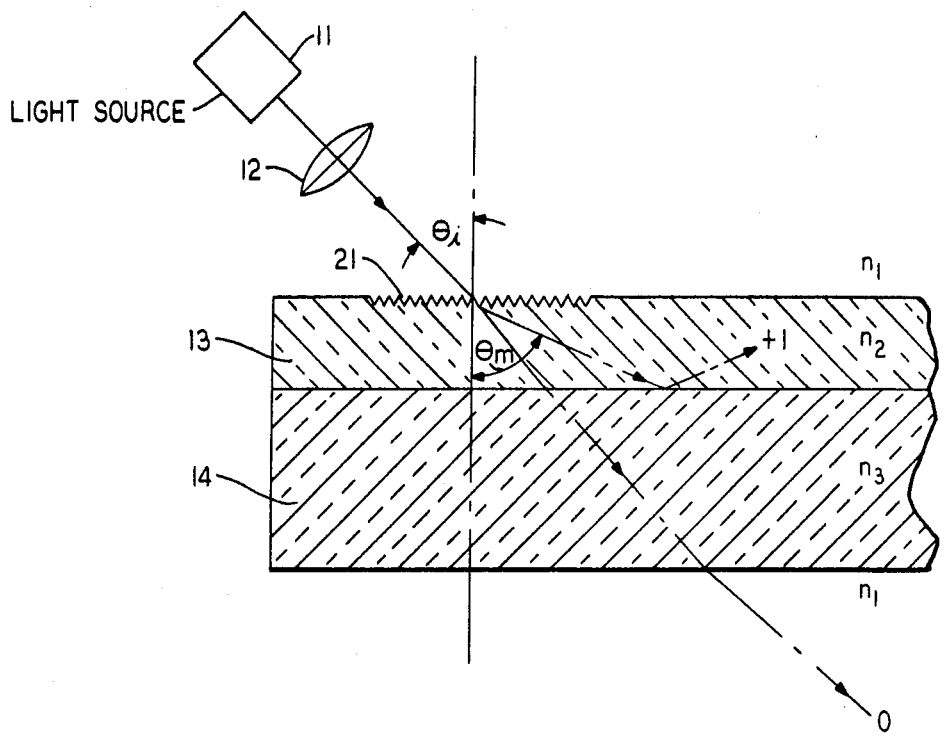
FIG. 2 is a diagrammatic view of a second illustrative embodiment of the invention.

FIG. 2, is a diagrammatic view basically similar to FIG. 1 but in which a transmission grating 21 is used instead of a reflection grating. For simplicity, elements common to the two figures have been given the same reference numerals. Light from source 11 and lens 12 impinges upon grating 21 at the angle $\theta_i$ and passes through the grating, the light emerging from the grating being in one or more grating orders. In FIG. 2 only the zero order and the +1 order have been shown. In the arrangement of FIG. 2, the angle $\theta_m$ is related to $\theta_i$ by $$\sin \theta_m = \frac{n_1}{n_2} \sin \theta_i + \frac{m\lambda_o}{an_2} \quad (5)$$

The conditions for trapping are the same as were given for the arrangement of FIG. 1, and the particular grating order trapped and the mode of propagation into which the incident light is coupled can be varied by varying $\theta_i$.

Grating 21 may take any one of a number of forms, such as an absorption grating or a phase grating. Efficiency of coupling is enhanced by the use of a blazed phase grating, the absorption type gratings being less efficient because of absorption and loss of a portion of the incident light. It is not necessary that the grating 21 be formed on or in the top surface of guide 13, although a reduction in bulk is achieved by so doing. Grating 21 may be a separate member in close proximity or in contact with the surface of guide 13.

Figure 3:
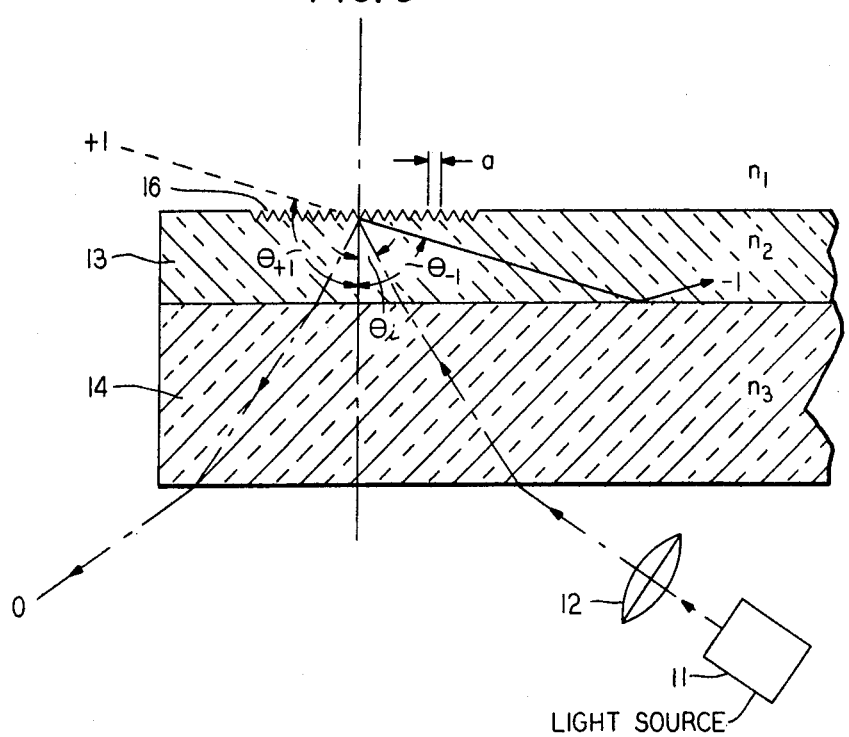
FIG. 3 is a diagrammatic view of still another illustrative embodiment of the invention.

Thus far the principles of the invention have been illustrated by demonstrating the trapping and hence coupling of positive grating orders. In a similar manner, negative grating orders may be trapped, with a possible increase in coupling efficiency. In FIG. 3 there is shown an arrangement basically similar to the arrangement of FIG. 1, in which the −1 reflection grating order is trapped in the guide. For simplicity, the same reference numerals as used in FIG. 1 are retained.

In the arrangement of FIG. 3, light from source 11 is directed into substrate 14 and guide 13 to impinge on reflection grating 16 at the angle $\theta_i$ such that the +1 grating order angle $\theta_{+1}$ satisfies the relationship $$\theta_{+1} > \frac{\pi}{2} \quad (6)$$

which requires that $$\sin \theta_i \geq 1 - \frac{\lambda_o}{an_2} \quad (7)$$

for the +1 grating order to be non-propagating. In addition, the −2 grating order should be non-propagating, which requires that $$\sin \theta_i \leq \frac{2\lambda_o}{an_2} - 1 \quad (8)$$

Thus the limits for the incident angle $\theta_i$ are defined as $$1 - \frac{\lambda_o}{an_2} \leq \sin \theta_i \leq \frac{2\lambda_o}{an_2} - 1 \quad (9)$$

which in turn establishes the condition $$a \leq \frac{3}{2}\left(\frac{\lambda_o}{n_2}\right) \quad (10)$$

for the grating wavelength. When Condition 10 prevails, it can be shown that $$1 - \frac{2\lambda_o}{an_2} \leq \sin \theta_{-1} \leq \frac{\lambda_o}{an_2} - 1 \quad (11)$$

which defines the tuning range of $\theta_{-1}$ for Condition 9.

In order to excite a guided mode in guide 13, the range of $\theta_{-1}$ should be sufficiently large to permit $$\sin \theta_{-1} = \frac{n_{\text{eff}}}{n_2} \quad (12)$$

where $n_{\text{eff}}$ is the effective index of refraction for the particular guided mode of interest, where $$n_3 \leq n_{\text{eff}} \leq n_2 (n_3 \geq n_1) \quad (13)$$

In a like manner, the value of $a$ and the range of $\theta_{-1}$ may be determined for a transmission grating arrangement. It is possible with such arrangements to choose the parameters of the system, including the grating wavelength or periodicity, to have a single propagating grating order, which is then trapped, thereby giving rise to high efficiency coupling.

In a reflection grating arrangement of the type depicted in FIG. 1, in which the guide 13 was glass having an index of refraction of 1.52, the substrate 14 was a transparent plastic having an index of refraction of 1.5, the grating wavelength $a$ was 1.9 microns, and the wavelength of the light was 6328 A., for first grating order trapping and phase matching $\theta_i$ was found to be approximately 55°. Variations in $\theta_i$ produced different propagating modes in the guide which were phase matched at different values of $\theta_i$, and it also proved possible to trap other than the +1 grating order by changes in $\theta_i$.

The various features and principles of the invention have been set forth in the herein presented illustrative embodiments. Other arrangements utilizing these principles may occur to workers skilled in the art. Thus particular types of optical gratings not herein specifically mentioned may be found to provide most efficient coupling for particular applications or at particular wavelengths, without departure from the basic principles of the present invention. It is also possible to use other than solid materials for the light guide.

What is claimed is:

1. A light wave coupling arrangement in a region having an index of refraction $n_1$ comprising:

an optical wave guiding member of material having an index of refraction $n_2$ which is greater than $n_1$, said wave guiding member having opposed surfaces;

a substrate of transparent material having opposed surfaces and an index of refraction $n_3$ which is less than $n_2$, said wave guiding member being mounted on one surface of said substrate;

a fixed optical grating extending along one of the surfaces of said wave guiding member, said one surface of said wave guiding member being an interface between said wave guiding member and said region having an index of refraction $n_1$; and means for directing a beam of light onto said grating at an angle $\theta_i$, angle $\theta_i$ being such that phase matching occurs between light in one of the grating orders and a propagating wave guide mode.

2. A light wave coupling arrangement as claimed in claim 1 wherein said grating is a transmission type grating.

3. A light wave coupling arrangement as claimed in claim 1 wherein said grating is a reflection type grating.

4. A light wave coupling arrangement as claimed in claim 1 wherein said optical grating is formed on said one surface of said wave guiding member.

5. A light wave coupling arrangement as claimed in claim 1 wherein the indices of refraction are related by $n_2 > n_3 > n_1$ where $n_1$ is the index of refraction of air.

6. A light wave coupling arrangement as claimed in claim 1 wherein the angle $\theta_i$ is related to the angle $\theta_m$ of the phase matching grating order by $$\sin \theta_m = \sin \theta_i + \frac{m\lambda_o}{an_2}$$

where $m$ is the grating order number, $a$ is the grating periodicity, and $\lambda_o$ is the wavelength of the light in vacuum.

7. A light wave coupling arrangement as claimed in claim 6 wherein the propagation constant of the phase matching grating order is given by $$\beta_m = \frac{2\pi n_2 \sin \theta_m}{\lambda_o}$$

8. A light wave coupling arrangement as claimed in claim 7 wherein the limits of $\beta_m$ for phase matching are defined by $$\frac{n_3 \omega}{c} \leq \beta_m \leq \frac{n_2 \omega}{c}$$

where $c$ is the velocity of light and $\omega$ is $2\pi f$ where $f$ is the light frequency.

9. A light wave coupling arrangement as claimed in claim 6 wherein the minimum value for $\theta_m$ for phase matching is given by $$\sin \theta_m \geq \frac{n_3}{n_2}$$

10. A light wave coupling arrangement as claimed in claim 1 wherein the angle $\theta_i$ is related to the angle $\theta_m$ of the phase matching grating order by $$\sin \theta_m = \frac{n_1}{n_2} \sin \theta_i + \frac{m\lambda_o}{an_2}$$

where $n_1$ is the index of refraction of air, $m$ is the grating order number, $\lambda_o$ is the wavelength of the light in vacuum and $a$ is the grating periodicity.

11. A light wave coupling arrangement as claimed in claim 1 wherein the angle $\theta_i$ satisfies the relationship $$\sin \theta_i \geq 1 - \frac{\lambda_o}{an_2}$$

where $\lambda_o$ is the wavelength of the light in vacuum and $a$ is the grating periodicity.

12. A light wave coupling arrangement as claimed in claim 11 wherein the angle $\theta_i$ further satisfies the relationship $$\sin \theta_i \leq \frac{2\lambda_o}{an_2} - 1$$

13. A light wave coupling arrangement as claimed in claim 11 wherein the grating periodicity satisfies the relationship $$a \leq \frac{3}{2} \frac{\lambda_o}{n_2}$$

14. A light wave coupling arrangement as claimed in claim 11 wherein the limits of the angle $\theta_{-1}$ of the $-1$ grating order for phase matching are defined by $$1 - \frac{2\lambda_o}{an_2} \leq \sin \theta_{-1} \leq -\frac{\lambda_o}{an_2}$$

References Cited

UNITED STATES PATENTS

| | | | |
|---|---|---|---|
| 3,489,481 | 1/1970 | Osterberg et al. | 350—96 WG UX |
| 3,403,955 | 10/1968 | Jueneman | 350—96 |
| 3,307,897 | 3/1967 | Lohmann | 350—160 |
| 3,471,214 | 10/1969 | Polanyi | 350—96 |
| 3,551,690 | 12/1970 | Korpel | 350—161 X |
| 3,560,724 | 2/1971 | Condell, Jr. | 350—96 WG UX |

JOHN K. CORBIN, Primary Examiner

U.S. Cl. X.R.

350—162 R

UNITED STATES PATENT OFFICE
CERTIFICATE OF CORRECTION

Patent No. 3,674,335                                   Dated July 4, 1972

Inventor(s) Arthur Ashkin and Erich Peter Ippen

It is certified that error appears in the above-identified patent and that said Letters Patent are hereby corrected as shown below:

Col. 6, line 35, the Equation in Claim 14 should read $$-1 - \frac{2\lambda_o}{an_2} \leq \sin\theta_{-1} \leq \frac{\lambda_o}{an_2} - 1.-$$

Signed and sealed this 26th day of December 1972.

(SEAL)
Attest:

EDWARD M. FLETCHER, JR.          ROBERT GOTTSCHALK
Attesting Officer                Commissioner of Patents